United States Patent

Davis

[15] 3,701,308
[45] Oct. 31, 1972

[54] PHOTOGRAPHIC CAMERA EXPOSURE CONTROLLING MEANS

[72] Inventor: Stuart C. Davis, Charlotte, N.C.

[73] Assignee: Photo Corporation of America, Charlotte, N.C.

[22] Filed: April 19, 1971

[21] Appl. No.: 135,209

[52] U.S. Cl. .....................95/11.5 R, 95/53 E, 95/59
[51] Int. Cl. ............................G03b 9/10, G03b 9/70
[58] Field of Search..95/11.5 R, 58, 59, 31 EL, 53 E, 95/53 EA, 53 EB, 53 R; 355/36

[56] References Cited

UNITED STATES PATENTS

| | | | |
|---|---|---|---|
| 2,679,790 | 6/1954 | Clark | 95/11.5 R |
| 2,987,976 | 6/1961 | Martin | 95/11.5 R X |
| 3,580,155 | 5/1971 | Zahn et al. | 95/58 |
| 3,200,722 | 8/1965 | Hutchison, Jr. | 95/11.5 R |
| 3,516,740 | 6/1970 | Clapp | 355/36 |

FOREIGN PATENTS OR APPLICATIONS

| 516,674 | 9/1955 | Canada | 95/31 |
|---|---|---|---|

*Primary Examiner*—Robert P. Greiner
*Attorney*—Parrott, Bell, Seltzer, Park & Gibson

[57] ABSTRACT

An exposure controlling subassembly for a photographic camera wherein a shutter is oscillated about a pivot axis from a light blocking position wholly occluding a shutter aperture to an exposure position wherein the shutter aperture is open and a flashtube controlling electrical switch is actuated by the shutter member upon movement thereof to the exposure position. The subassembly containing the shutter is moduarly removable from the photographic camera and replaceable in the event of failure. The shutter within the subassembly is mounted for oscillatory movement and is electrically operated.

4 Claims, 6 Drawing Figures

PATENTED OCT 31 1972

INVENTOR:
STUART C. DAVIS

BY Parrott, Bell, Seltzer, Park & Gibson
ATTORNEYS

PATENTED OCT 31 1972 3,701,308

INVENTOR:
STUART C. DAVIS

BY Parrott, Bell, Seltzer, Park & Gibson
ATTORNEYS

PHOTOGRAPHIC CAMERA EXPOSURE CONTROLLING MEANS

It is conventional for the exposure of photographic film in a camera to be controlled by a shutter mechanism. Heretofore, and particularly as "faster" photographic films have been developed, significant attention has been given to the development of shutter mechanisms capable of accurate timing of quite short intervals of exposure, with such development typically being toward a multiple member mechanism. More specifically, shutter mechanisms of conventional construction typically employ a plurality of shutter members each mounted for rotation about a corresponding axis, with the members being coupled together by suitable gear trains or the like for joint movement. Desirably, such a prior shutter mechanism is capable of accomplishing relatively short exposure times while avoiding uneven exposure over the area of the photographic film.

Two recent developments in photography have led to difficulties with such prior shutter mechanisms. First, gaseous discharge, stroboscopic electrical flashtubes have been developed for use as light sources in photography and, due to the extremely short duration of light emitted from such a flashtube, have accomplished an equivalent exposure time on the order of the fastest time achieved by the prior shutter mechanisms. Second, portrait photography of customers in department stores and the like has given rise to a photographic business in which reliability of the equipment employed must be of a very high order.

While the first development mentioned above has lessened the necessity of employing prior shutter mechanisms in achieving desired short exposure times, the latter development has particularly pointed out the loss which may be incurred should a shutter mechanism of the type heretofore used fail. In particular, should one of the plurality of shutter members hang or become inoperative, and thus remain in a light blocking position, the resultant photographic negative will be vignetted or partially blocked. In those photographic businesses where the exposures made through a given camera easily number into high hundreds of thousands a year, such as in the high density portrait photography business mentioned briefly above, hundreds of exposures may be made before a partially inoperative shutter is noticed, with significant economic loss to the operators of the photographic business.

With the above discussion in mind, it is an object of the present invention to provide an exposure controlling means for a photographic camera which is of high reliability. In accomplishing this object of the present invention, the exposure controlling means is constructed and arranged for displacement of a portion thereof between a light blocking position wholly occluding a shutter aperture and an exposure position wherein the shutter aperture is open and with the thusly moving shutter member cooperating with flashtube controlling electrical switch means adapted to energize a gaseous discharge flashtube which emits light for exposure of photographic film. Through the utilization of a particularly direct mechanical solution to the camera operation problems presented, the difficulties and deficiencies of prior shutter mechanisms are avoided by the present invention.

Some of the objects and advantages of the invention having been stated, others will appear as the description proceeds, when taken in connection with the accompanying drawings, in which.

Figure 1:
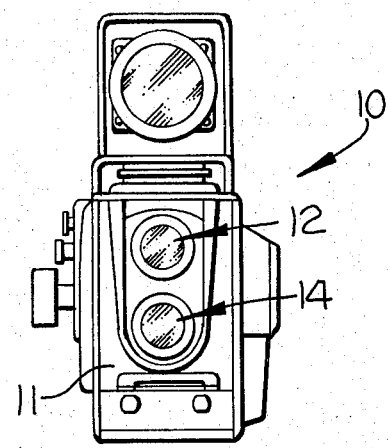
FIG. 1 is a reduced scale front elevation view of a photographic camera incorporating the exposure controlling means of the present invention.
Figure 2:
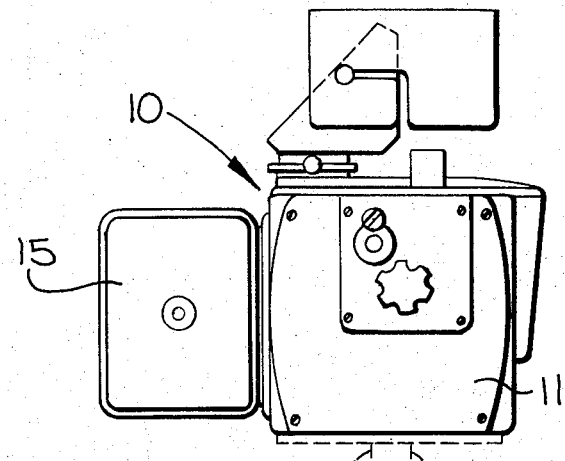
FIG. 2 is a side elevation view, on a scale comparable to FIG. 1, showing the camera of FIG. 1.
Figure 3:
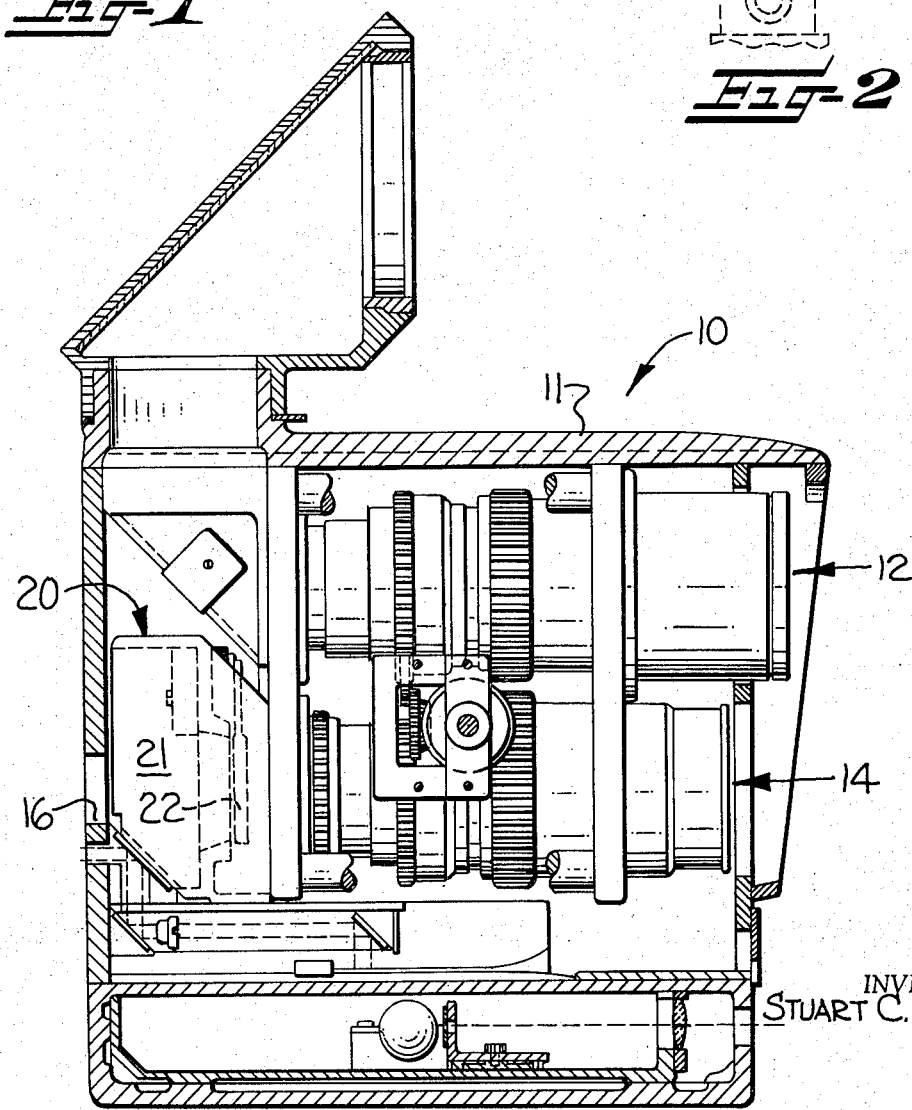
FIG. 3 is an enlarged elevation view, partially in section, through the camera of FIGS. 1 and 2.

As illustrated in the accompanying drawings, the present invention is herein disclosed in conjunction with a photographic camera generally indicated at 10. While a specific photographic camera 10 is herein disclosed, it is to be understood at the outset that the present invention contemplates usefulness of the exposure controlling means described in greater detail hereinafter with a range of photographic camera structures. It is not intended that the present invention be restricted solely to the overall combination with the structure of the camera 10, even though such a combination is contemplated as the preferred embodiment for the present invention. The photographic camera 10 includes a camera body 11, a viewing lens system 12 mounted in the camera body 11, and a taking lens system 14 mounted in the camera body 11 in predetermined spaced relation to the viewing lens system 12. The camera body 11 is adapted to mount a film magazine 15, and the taking lens system 14 directs light along an optical axis toward a film plane aperture 16 in the rear face of the camera body 11 and toward film mounted in the magazine 15 at a film plane spaced closely adjacent the film plane apertures 16.

Mounted as a module within the camera body 11 is an exposure controlling means in accordance with the present invention, generally indicated by the reference character 20. In accordance with the present invention, the exposure controlling means 20 comprises a subassembly housing 21 which supports a shutter member 22, actuating means 24 and a flashtube controlling electrical switch means 25.

Figure 4:
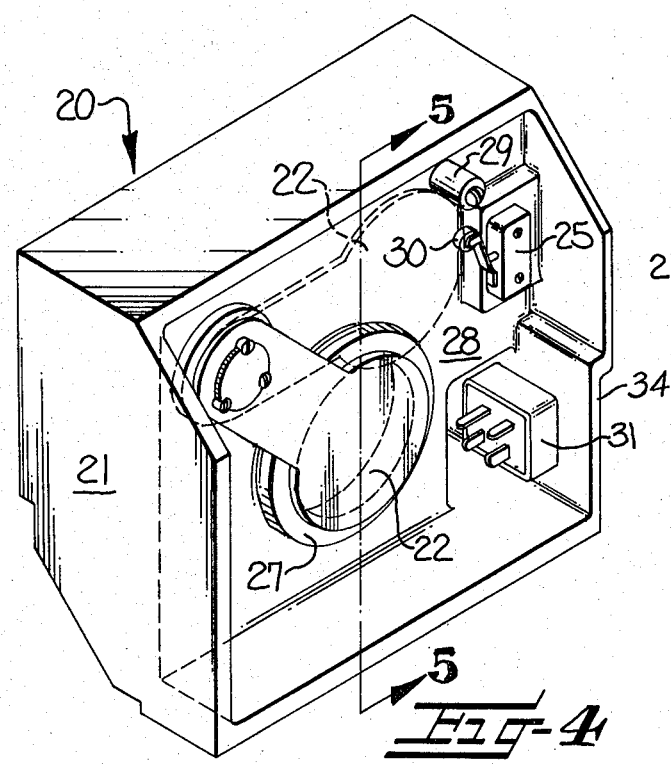
FIG. 4 is an isometric view of the exposure controlling means of the present invention, removed from the camera of FIGS. 1-3.
Figure 5:
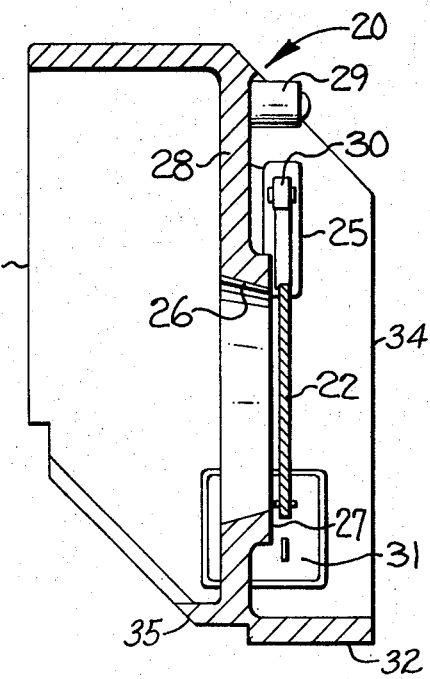
FIG. 5 is an elevation view, in section, through the exposure controlling means of FIG. 4, taken generally along the line 5—5 in that Figure.
Figure 6:
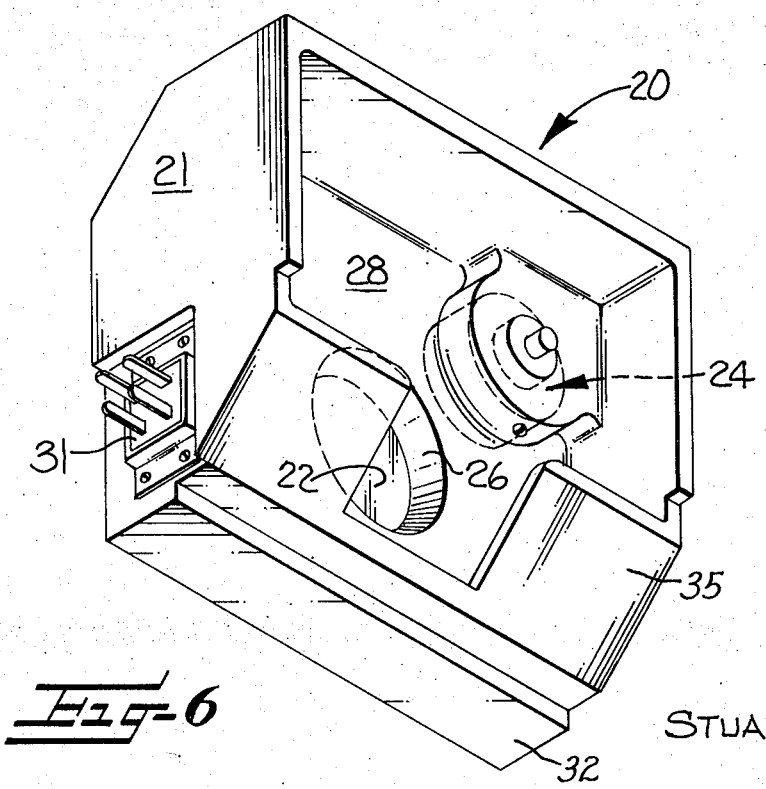
FIG. 6 is an isometric view of the exposure controlling means of FIGS. 4 and 5, taken from the position opposite the position illustrated in FIG. 4.

In accordance with the present invention, the shutter member 22 is supported for oscillatory movement about a pivot axis spaced from and parallel to the optical axis within the camera body 11 along which light is directed by the taking lens system 14. Oscillatory movement of the shutter member 22 about its pivot axis displaces a portion thereof between a light blocking position wholly occluding a shutter aperture 26 (solid line position in FIGS. 4 and 5) and an exposure position wherein the shutter aperture is open (phantom line position in FIG. 4). Desirably, the shutter member 22 comprises a generally circular terminal end portion sized for occluding the shutter aperture 26 and a support arm portion extending to one side of the generally circular terminal end portion (FIG. 4). In order to reduce the likelihood of inadvertent exposure of photographic film to light leaking through the camera 10 along the optical axis, the terminal end portion of the shutter member 22 preferably moves closely adjacent the surface of a boss 27 formed in an intermediate partition 28 which extends through the subassembly housing 21.

The actuating means 24 comprises electrically operated motive means for displacing the shutter member 22 from the light blocking position, which motive means is adapted for remotely controlled actuation by a photographer. In the form illustrated, the motive means comprises a rotary electrical solenoid having a coil and an armature arranged for rotation relative to the coil in response to a change in electrical energization thereof. The solenoid is mounted in the partition 28 for rotation of the armature thereof about the pivot axis for the shutter member 22 and is directly connected to the shutter member 22 for supporting and moving the same.

Also mounted from the partition 28 is the flashtube controlling electrical switch means 25 and a resilient abutment means 29. The electrical switch means 25 preferably is an electrical switch of the microswitch type, mounted in predetermined relation to the shutter member 22 for actuation by the shutter member upon movement of the terminal end portion thereof to the exposure position. On actuation of the switch means 25 by the shutter member 22, the switch means changes conductive state so as to energize a gaseous discharge flashtube emitting light for exposure of photographic film disposed at the film plane, with the flashtube being energized at such time as the shutter aperture 26 is open and unobstructed. In particular, the relative positioning of the switch means 25 and the shutter member 22 is such that the shutter member 22 engages an actuation roller 30 of the switch means to complete an electrical circuit through the switch means 25 as the terminal end portion of the shutter member 22 is completely withdrawn from the light blocking position. At substantially the same time, the shutter member 22 engages the resilient abutment means 29, for rebounding of the shutter member 22 to the light blocking position.

By means of a multiple prong connector 31 mounted in the subassembly housing 21, interconnection of the actuating means 24 and flashtube controlling electrical switch means 25 with other elements of the camera 10 is readily accomplished and field maintenance of the camera 10 is facilitated. More particularly, conductors leading from the switch means 25 to the controlled gaseous discharge flashtube pass through the camera body 11 by means of the connector 31. Further, the actuating means 24 is operatively connected with a suitable pulse energizing means such as a multivibrator circuit, whereby a photographer operating the camera 10 may close a hand held switch and thereby apply a pulse of predetermined relatively short duration to the coil of the rotary electrical solenoid. Preferably, the duration of the pulse applied to the rotary electrical solenoid is on the order of one-thirtieth second, to ensure that the shutter member 22 is free to return to the light blocking position after an exposure has been completed.

It is to be noted that, in operation of the camera 10 incorporating the exposure controlling means 20 of the present invention, reliance is placed upon the gaseous discharge flashtube for achieving an effective exposure time which is relatively short. Preferably, the film used in conjunction with the camera 10 is of relatively slow speed such that no effective exposure is obtained during the interval of time required to move the shutter member 22 in oscillation from the light blocking position to the exposure position and from the exposure position back to the light blocking position. The entire effective exposure occurs upon energization of the gaseous discharge flashtube while the shutter member 22 is entirely withdrawn from the light blocking position.

While the straightforward mechanical solution herein disclosed avoids the difficulties of shutter mechanism reliability which have heretofore been encountered, it is to be noted that the use of a subassembly casing 21 and connector 31 permit the exposure controlling means 20 of the present invention to be readily removed from operative association with other elements of the camera 10, for replacement of a failed exposure controlling mechanism through substitution of an operative mechanism. The removable mounting of the sub-assembly housing 21 within the camera body 11 (FIGS. 3 through 6) is facilitated by the cooperation with the connector 31 of planar surfaces 32, 34, 35 formed on the sub-assembly housing 21 and cooperating with surfaces within the camera body 11. Particularly in mass portrait photographic operations such as briefly mentioned hereinabove, such ready correction of a malfunctioning exposure controlling means represents an important advantage over prior shutter repair practices.

In the drawings and specification, there has been set forth a preferred embodiment of the invention, and although specific terms are employed, they are used in a generic and descriptive sense only and not for purposes of limitation.

What is claimed is:

1. In a photographic camera having a camera body, optical means for directing light along an optical axis within said camera body for exposure of photographic film and film holding means for positioning photographic film in predetermined relation to said optical means for exposure thereof, the combination therewith of means comprising:

a subassembly housing defining a shutter aperture, a shutter member mounted in said subassembly housing for oscillatory movement about a pivot axis spaced from said shutter aperture for displacement of a portion thereof between a light blocking position wholly occluding said shutter aperture and an exposure position wherein said shutter aperture is open, electrically operated actuating means mounted in said subassembly housing and operatively connected to said shutter member for moving said shutter member about said axis, and positioning means for removably mounting said subassembly housing within said camera body with said shutter aperture interposed between said optical means and said film holding means and including electrical connector means for establishing electrical connection through said camera body to said actuating means, whereby said subassembly housing and elements mounted therein is modularly removable and replaceable in the event of failure and camera maintenance is hereby facilitated.

2. Apparatus according to claim 1 wherein said actuating means comprises a rotary electrical solenoid having a coil and an armature arranged for rotation relative to said coil in response to a change in electrical energization thereof, said solenoid being mounted for rotation of said armature about said pivot axis and said armature being directly connected to said shutter member for supporting and moving the same.

3. Apparatus according to claim 1 further comprising resilient abutment means disposed in the path of movement of said shutter member for engagement therewith upon said shutter member portion reaching said exposure position, and for rebounding said shutter member to said light blocking position of said portion.

4. Apparatus according to claim 3 wherein said electrical switch means is disposed relative to said abutment means for contact with said shutter member means, said electrical switch means completing a circuit adapted for energization of a flashtube in response to such contact.

* * * * *